United States Patent [19]

Adachi et al.

[11] 3,957,691

[45] May 18, 1976

[54] CATALYST FOR TREATING EXHAUST GAS FROM ENGINE VEHICLES

[75] Inventors: Shichiro Adachi; Toshinobu Miyakoshi, both of Tokyo, Japan

[73] Assignee: Tokyo Denki Kagaku Kogyo Kabushiki Kaisha (Tokyo Electronics Co., Ltd.), Tokyo, Japan

[22] Filed: July 5, 1973

[21] Appl. No.: 376,438

[30] Foreign Application Priority Data

Mar. 28, 1973 Japan.............................. 48-35451
Mar. 29, 1973 Japan.............................. 48-36089

[52] U.S. Cl. ............................ 252/465; 252/466 B; 252/466 J; 252/470; 252/471; 252/474; 423/213.5

[51] Int. Cl.² ..................... B01J 21/04; B01J 23/42; B01J 23/46; B01J 23/74

[58] Field of Search ................ 252/466 J, 470, 472, 252/474, 465, 466 PT, 471, 466 B; 423/213.5, 594, 600

[56] References Cited
UNITED STATES PATENTS

| | | | |
|---|---|---|---|
| 2,071,119 | 2/1937 | Harger | 423/213.2 |
| 2,818,418 | 12/1957 | Rottig et al. | 252/474 X |
| 3,331,787 | 7/1967 | Keith et al. | 252/477 R |
| 3,366,705 | 1/1968 | Giannetti et al. | 252/470 X |
| 3,397,154 | 8/1968 | Talsma | 252/463 |
| 3,686,347 | 8/1972 | Dean et al. | 252/466 J |
| 3,784,675 | 1/1974 | Kobylinski et al. | 423/213.5 |
| 3,787,332 | 1/1974 | Sugier | 252/466 J |
| 3,787,333 | 1/1974 | Ichihara et al. | 252/465 |
| 3,809,643 | 5/1974 | Chun et al. | 252/474 X |
| 3,816,401 | 6/1974 | Hansford | 252/474 X |

*Primary Examiner*—W. J. Shine
*Attorney, Agent, or Firm*—William J. Daniel

[57] ABSTRACT

A catalyst for treating exhaust gas from engine vehicles which comprises a sintered substance composed of ferric oxide and at least one metallic oxide and forming at least in part a spinel crystal structure. This catalyst can be strengthened by adding aluminum oxide as an additional ingredient. Also, by adding metallic ruthenium to the catalyst, its rate of converting nitrogen compounds can be increased and by adding metallic platinum to the catalyst, its rate of converting carbon monoxide and hydrocarbons can be increased.

2 Claims, 17 Drawing Figures

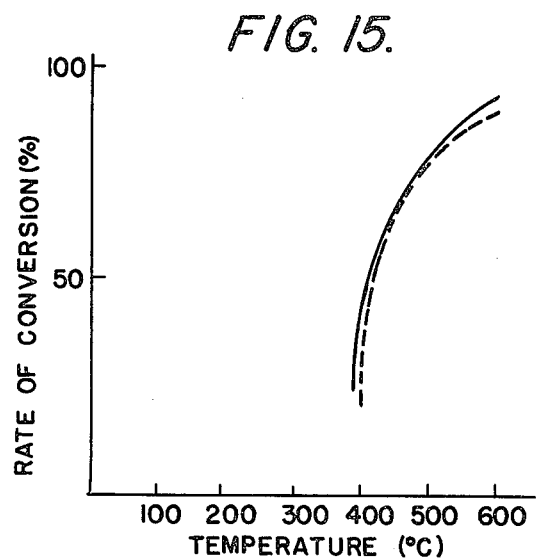
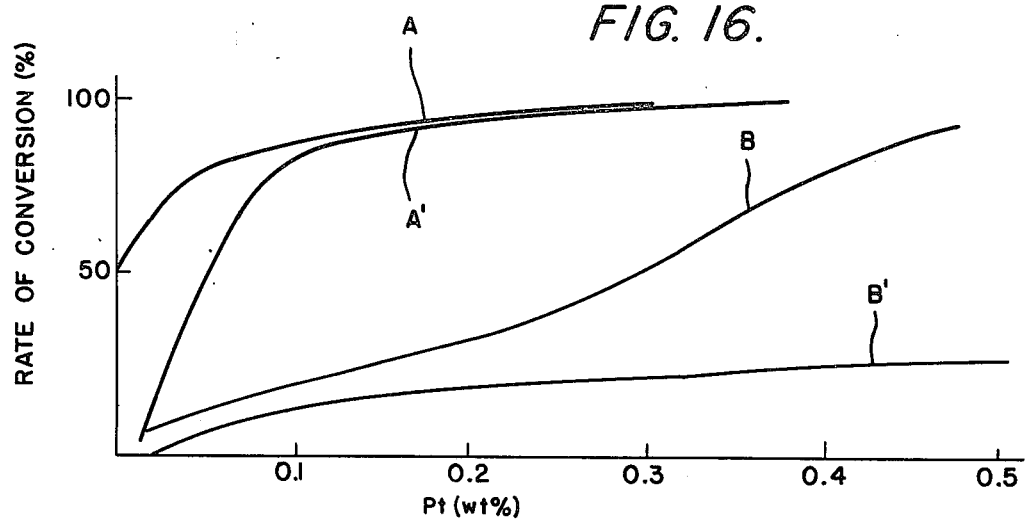
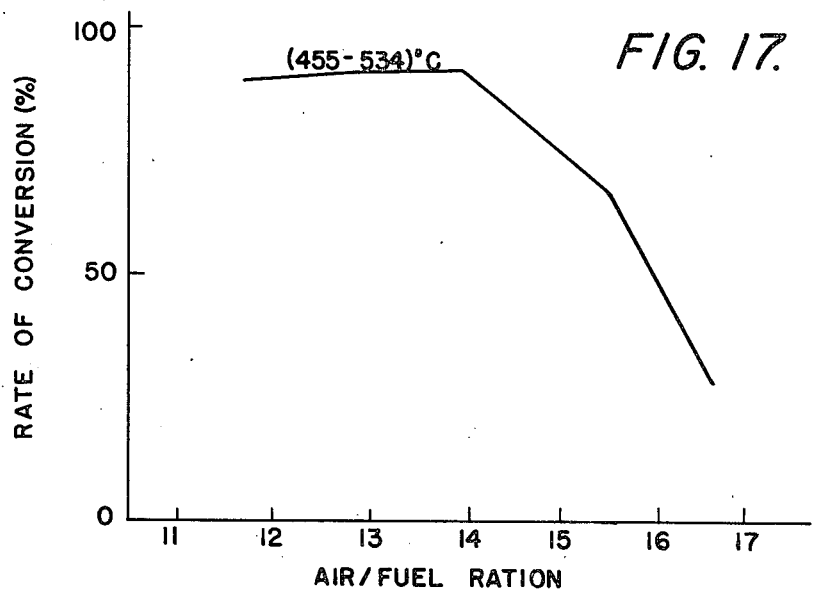

CATALYST FOR TREATING EXHAUST GAS FROM ENGINE VEHICLES

BACKGROUND OF THE INVENTION

This invention relates to a catalyst to be used for treating exhaust gas from engine vehicles to make it harmless.

In recent years, air pollution by exhaust gas from engine vehicles (motor vehicles) including automobiles has become a serious social problem. Thus, making the exhaust gas harmless has been identified as an important subject for prevention of environmental pollution.

Out of the components of exhaust gas, the substances that create the most serious problem from the standpoint of environmental pollution are carbon monooxide, nitrogen oxides and unburnt hydrocarbons. In the past, such methods as complete combustion by using an "after burner", conversion of these harmful substances into harmless substances by the use of a catalyst converter, and removal of the harmful substances by passing them through a washing liquid have been proposed as ways for removing these harmful substances.

However, the "after burner" has some disadvantages; it has difficulty in maintaining its flame and in low temperature ignition and promotes the formation of nitrogen oxides. On the other hand, the washing method is inconvenient because it requires a large volume of liquid. For these reasons, the catalyst converter method has recently received major emphasis. Hitherto, oxides of such metals as iron, manganese, copper, molybdenum and vanadium or a mixture thereof carried on a support such as alumina or silica have been suggested as catalysts. However, these catalysts cannot be said to be satisfactory in practical use because they involve some problems in connection with mechanical strength and heat resistance and are susceptible to poisoning by lead often present in fuel.

BRIEF SUMMARY OF THE INVENTION

Accordingly, it is an object of this invention to provide a new catalyst for treating exhaust gas from automotive vehicles which has good mechanical strength and heat resistance, and is resistant against poisoning by lead.

It is another object of this invention to provide a new catalyst system which is particularly effective for eliminating nitrogen compounds in exhaust gases.

It is still another object of this invention to provide a new catalyst system which is particularly effective for removing carbon monoxide in exhaust gases.

It is the further object of this invention to provide a practical exhaust gas purification device.

These and other objects, features and advantages of the invention will become more apparent on reading of the following detailed description and drawings, in which:

FIG. 1 is a cross sectional view showing an example of an exhaust gas purification device charged with the catalyst of this invention.

FIGS. 2, 3, 4 and 6 respectively are graphs which show the relationship between the contact temperature when the exhaust gas is treated with an example of the catalyst of this invention and the conversion rate of hydrocarbon and carbon monoxide.

FIGS. 12–15 are respectively a graph showing the relation between the contact temperature and the rate of conversion when the exhaust gas is treated with an example of the catalyst of this invention.

FIG. 16 is a graph showing the relation between the platinum content and the rate of conversion in the catalyst of this invention.

FIG. 17 is a graph showing the relation between the air/fuel ratio and the rate of conversion in a practical performance test for the catalyst of this invention.

DETAILED DESCRIPTION OF THE INVENTION

Figure 1:
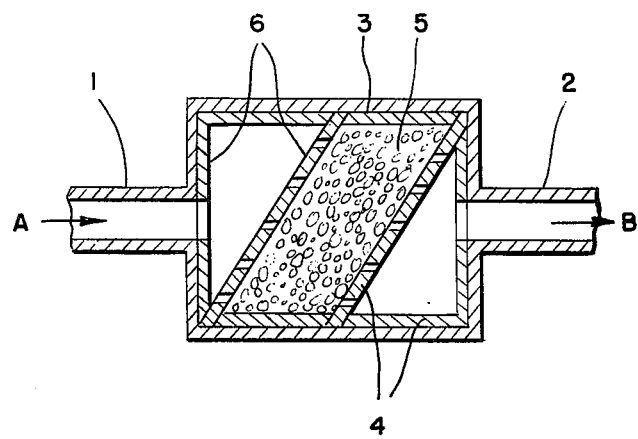

The above stated objects can be attained easily by using a sintered product which is composed of ferric oxide and at least one of another metallic oxide and which has at least partly a spinel crystal in its structure as a catalyst for treating exhaust gas from automobiles.

In this invention, the metallic oxide which is used together with ferric oxide may be either an oxide of a transition metal or an oxide of a typical metal. As examples of the oxides of transition metals, the oxides of such metals as bivalent iron, copper, zinc, chromium, manganese, cobalt and nickel may be mentioned. On the other hand, oxides of such typical metals as magnesium, calcium, strontium and barium may be given as examples of said typical metallic oxides.

The catalyst of this invention is characterized in that at least a part of the sintered substance is in spinel crystal structure and because of the existence of such spinel crystal structure mechanical strength and strong resistance against poisoning are imparted to the catalyst. The metallic oxide to be used together with the ferric oxide, must, therefore, be one that can form a spinel crystal structure with the ferric oxide, i.e. one that can form a bivalent oxide.

The catalyst of this invention can be manufactured by first mixing uniformly ferric oxide with at least one other kind of metallic oxide, shaping the mixture into a desired form and then sintering it by heating. In this case, a metal compound which can be converted into an oxide under sintering conditions, such as a metal carbonate or metal hydroxide, can also be used in place of the metallic oxide.

The proportion of the individual components in manufacturing the catalyst of this invention can be varied within a wide range of ferric oxide 5 – 90 mol % and a total of other metal oxides 95 – 10 mol %. An especially preferable range is 20 – 75 mol % of ferric oxide and 80 – 25 mol % of the total of other metallic oxides. In the preparation of the catalyst of this invention it is possible to use, if desired, such sintering promoting agents as vanadium pentoxide, or a binder, for example, polyvinyl alcohol, as auxiliary additives. The mixture prepared by combining various ingredients as above is sintered according to any conventional method. When sintering is effected at a relatively low temperature, for example, at 600° – 900°C for a short period of time, a product with spinel crystal structure in part will be produced, but if the sintering is effected at a relatively high temperature, for example, at 1000° – 1300°C for a long period of time, a product with chiefly spinel crystal structure will be produced. Depending upon the purpose of use, the proportion of spinel crystal structure in the catalyst can be varied freely by controlling the sintering condition. The fact that the catalyst of this invention has the spinel crystal structure can be recognized clearly by X-ray diffraction examination and the fact that the catalyst has a structure reinforced by an aluminum oxide skeleton can be observed by the use of an electron microscope.

The sintered substance thus prepared can be used by crushing it into granules of a desired size.

In accordance with an especially preferred embodiment of this invention, the catalyst of this invention is prepared by shaping a homogeneous mixture of 5 – 90 mol % of ferric oxide and 95 – 10 mol % of at least one metallic oxide selected from the group consisting of manganese dioxide, cupric oxide and chromium oxide into a desired shape and sintering it under heating at 600° – 1050°C for 0.5 – 10 hours, and, if necessary, pulverizing the resultant sintered substance into particles of a suitable size. In this case, a compound of being converted into a metallic oxide under the sintering condition, for example, a hydroxide, such as ferric hydroxide or cupric hydroxide, or a carbonate, such as cupric carbonate, can be used at the starting material in place of the metallic oxide. If desired, one or more of oxides of other typical metals or transition metals can be used in addition to said ingredients. It is also possible to incorporate into the catalyst such porous carrier substances as alumina or silica to promote contact with exhaust gas.

In accordance with another embodiment of this invention, this catalyst comprises a product prepared by incorporating ferric oxide with another metallic oxide, for example, manganese dioxide and/or cupric oxide and, if necessary, aluminum oxide, and sintering the mixture under such conditions that it forms at least in part a spinel crystal structure. When aluminum oxide is present in the sintered substance, resistance to deterioration of the catalytic activity is extremely improved to extend the life of the catalyst.

In this case, it is desirable that the proportion of other metallic oxides to be incorporated into the ferric oxide be limited from 1:20 to 8:1 on the basis of the metal atoms. It is advantageous that aluminum oxide having a particle size large enough to form a network structure with at least 1 micron space is employed in an amount of 5 – 60 mol % based on the total ingredients of the catalyst.

In accordance with still another embodiment of this invention, the rate of eliminating nitrogen compounds, especially ammonia, can be increased by adding to a catalyst which comprises a sintered substance composed of ferric oxide and at least one other metallic oxide and having in part at least a spinel crystal structure, 0.0005 – 2.0 % by weight, based on the sintered substance, of metallic ruthenium.

If nitrogen oxides such as nitrogen monoxide exist in the exhaust gas, it reacts with carbon monoxide and water vapor (or hydrogen) and forms ammonia, thus making one of the causes of air pollution. However, it has been found that when the metallic ruthenium is present in the catalyst, the metallic ruthenium changes ammonia into nitrogen and hydrogen according to the following formula:

thus rendering the ammonia harmless.

The amount of the metallic ruthenium required to be added is 0.0005 – 2.0 % by weight of the total weight of the catalyst. There is no particular advantage in using a further increased amount. Addition of ruthenium can be attained by dissolving a soluble ruthenium salt, such as ruthenium carbonyl, ruthenium nitrosyl, ruthenates or ruthenium halides, or a complex ruthenium chloride dihydrate [Ru)NH$_3$)$_4$(OH)Cl]Cl.2H$_2$O in a suitable solvent to form a solution, impregnating the sintered substance with the solution to allow the substance to adsorb a desired amount of ruthenium, drying the sintered substance and then heating it at 300° – 900°C to fix the ruthenium. The majority of ruthenium is carried in the metallic form on the sintered substance.

If the exhaust gas is treated with the catalyst having ruthenium carried thereon, an extremely high rate of removing nitrogen compounds can be obtained as compared with the case of using the catalyst carrying no ruthenium thereon.

In accordance with further embodiment of this invention, the rate of converting carbon monoxide and hydrocarbons can remarkably be improved by adding to the sintered substance composed of ferric oxide and at least one other metal oxide and having at least in part a spinel crystal structure, 0.1 – 2.0 % by weight, based on the sintered substance, of platinum. Addition of platinum to the sintered substance is carried out, for example, by soaking the substance with an aqueous platinate solution to impregnate the substance with a desired amount of platinum and then heating the sintered substance at 400° – 700°C in nitrogen atmosphere for 0.5 – 5 hours.

The catalyst of this invention for treating the exhaust gas can be shaped into any desired form, such as pills, pellets, beads, etc., and used in a condition packed into a converter. Unlike the conventional catalyst for use in converters, the catalyst of this invention is excellent in mechanical strength such as impact strength or compression strength. In addition, the catalyst of this invention is hardly susceptible to poisoning by lead components in gasoline. It is an additional merit of the catalyst of this invention that the conversion rate of not only carbon monoxide and nitrogen compounds but also unburnt hydrocarbons can be increased remarkably by selecting properly the kinds of metallic oxides and the proportion thereof. On the use of the conventional catalysts, it was necessary to select ones effective at a temperature below 700°C and ones effective at a temperature of 700° – 1000°C in view of the relation between heat resistance and activity. However, as the catalyst of this invention is stable over a wide range of temperature of 200° – 1100°C, satisfactory effects can be achieved by using only one kind of catalyst.

When the catalyst of this invention is used as a converter, it is advantageous to charge it into an exhaust gas purification device the inner wall of which is lined with an oxide of such metals as copper, chromium, iron, cobalt, nickel, manganese and zinc.

An example of the exhaust gas purification devices of this type is shown in FIG. 1.

FIG. 1 is a side cross section of an exhaust gas purification device charged with the catalyst of this invention. In FIG. 1, a stream of exhaust gas (A) enters through 1 and passes through a catalyst-filled chamber 3 where the purification of the gas is effected and a stream of purified exhaust gas (B) is vented through 2. This purification device 3 has an inner wall made of an adequate metal 4, the surface of the inner wall being coated with a metal oxide having a catalytic activity such as cupric oxide.

The use of a device having such structure serves to increase the catalytic action of the catalyst of this invention for purifying exhaust gas.

The following examples are included merely to help in understanding this invention more readily and variations may be made by those skilled in the art without departing from the spirit and scope of the invention.

EXAMPLE 1

To a mixture composed of 55 mol % of ferric oxide, 25 mol % of manganese oxide, 15 mol % of zinc oxide and 5 mol % of cupric oxide was added 3% by weight of vanadium pentoxide and, after making the mixture into a solid mass by applying a load of 1000 kg/cm$^2$, it was sintered by heating for about two hours at about 1350°C.

The sintered substance was then crushed into particles and about 10 cc of the crushed particles of 2 – 5 mm in diameter were packed into a glass reactiion tube (15 mm in diameter × 500 mm in length) and exhaust gas with 1 % of carbon monoxide and 500 ppm of hydrocarbons was passed through the reaction tube at a space velocity of $1.0 \times 10^4$ hr.$^{-1}$ whereby the rates of conversion were measured at various temperatures.

Figure 2:
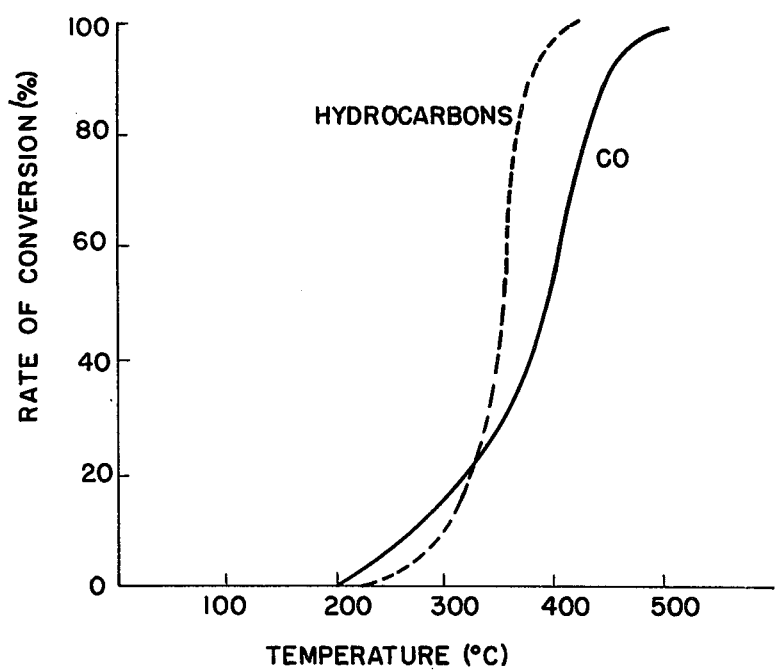

FIG. 2 is a graph showing the relationship between the temperatures and the rate of conversion.

As can be seen from this graph, hydrocarbons and carbon monoxide are almost completely removed above about 400°C and about 500°C respectively.

EXAMPLE 2

To a mixture of 55 mol % of ferric oxide and 36 mol % of manganese dioxide and 9 mol % of cupric oxide was added 20 % by weight, based on the total weight of said metallic oxide, of a 6 % aqueous solution of polyvinyl alcohol as a binder and, after shaping the resultant mixture into granules of 1.5 – 3.0 mm in diameter, the mixture was sintered at about 900°C for about 2 hours.

Then, 6 cc of the sintered substance thus prepared were packed into a quartz glass reaction tube (66 mm in inside diameter × 500 mm in length) and a gas mixture composed of 4.5% carbon monoxide, 0.5 % propane, 7–5% oxygen, 10.5 % carbon dioxide and 77 % nitrogen was passed through the reaction tube at a space velocity of $4 \times 10^4$/ hr. whereby the rates of conversion at different temperatures were measured.

Figure 3:
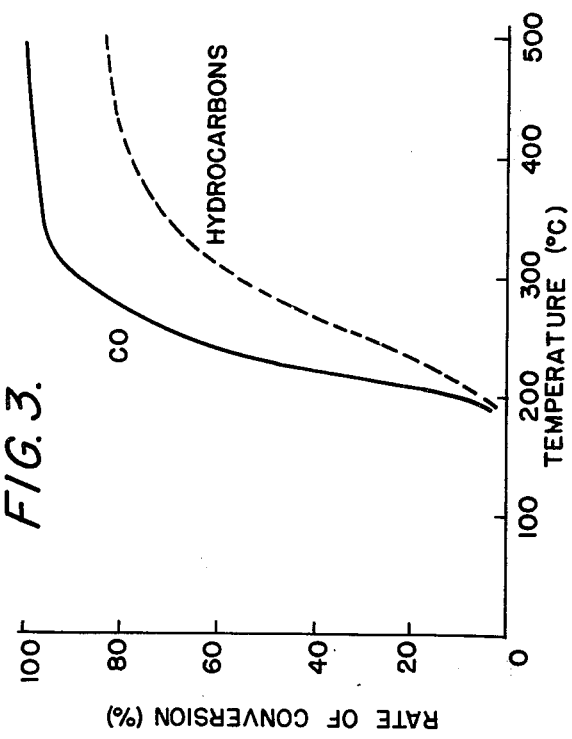

The results are shown by way of a graph in FIG. 3. As the graph clearly shows, carbon monoxide was effectively removed.

EXAMPLE 3

To a mixture composed of 40 mol % of ferric oxide, 48 mol % by manganese dioxide and 12 mol % of cupric oxide was added 20 % by weight, based on the total weight of said metallic oxides, of a 6 % aqueous solution of polyvinyl alcohol as a binder and, after shaping the resultant mixture once into pills, the mixture was shaped into a small column of 3.2 mm in diameter × 3.2 mm in length by application of a load of 1000 kg/cm$^2$ and then sintered at about 900°C for about 2 hours.

Figure 4:
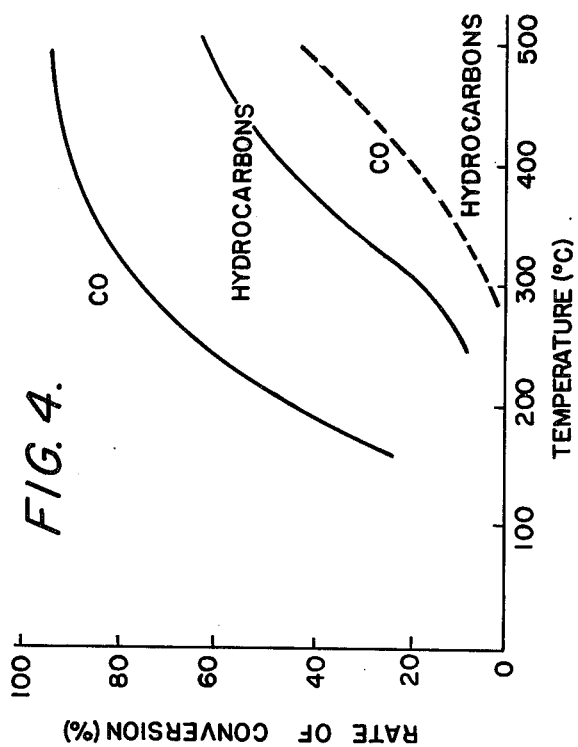

Then, 6 cc of the sintered substance was packed into a quartz glass reaction tube (16 mm in inside diameter by 500 mm in length) and a gas mixture composed of 4.5 % carbon monoxide, 0.5 % propane, 7.5 % oxygen, 10.5 % carbon dioxide and 77 % nitrogen was passed through the reaction tube at a space velocity of $4 \times 10^4$/hr., whereby the rates of conversion at different temperatures were measured. The results are shown by way of a dotted line graph in FIG. 4.

The aforementioned sintered substance was further heated at 700°C for about 10 hours in oxygen atmosphere to fix oxygen and then tested under the same conditions as stated above to measure the rate of conversion. The results are shown by way of a continuous line graph in FIG. 4. As is evident from the graph, addition of an adequate after-treatment serves to enhance remarkably the characteristic effects of the catalyst of this invention.

EXAMPLE 4

To each of several mixtures composed of ferric oxide, manganese dioxide and cupric oxide in various proportions was added 20 % by weight of a 6% solution of polyvinyl alcohol as a binder, and the admixture was shaped into granules of 1.5 – 3.0 mm in diameter and heated at about 900°C for about 2 hours to effect sintering.

Then, 6 cc of the resulting sintered substance in the form of pills were packed into a quartz glass reaction tube (16 mm in inside diameter × 500 mm in length) and a gas mixture consisting of 4.5 % carbon monoxide, 0.5 % propane, 7.5 % oxygen, 10.5 % carbon dioxide and 77 % nitrogen was passed throgh the reaction tube at a space velocity of $4 \times 10^4$/hr. whereby the rates of conversion at the contact temperature of 400°C was measured. The results are shown in Table 1 below.

Table 1

| Exp. No. | Catalyst Composition (mol %) | | | Conversion Rate (%) | |
|---|---|---|---|---|---|
| | Fe$_2$O$_3$ | MnO$_2$ | CuO | CO | Hydrocarbons |
| 1 | 35 | 52 | 13 | 50 | 21 |
| 2 | 40 | 48 | 12 | 72 | 26 |
| 3 | 45 | 0 | 55 | 93 | 51 |
| 4 | 45 | 11 | 44 | 42 | — |
| 5 | 45 | 33 | 22 | 73 | 16 |
| 6 | 45 | 44 | 11 | 66 | 32 |
| 7 | 50 | 40 | 10 | 73 | — |
| 8 | 55 | 36 | 9 | 98 | 80 |
| 9 | 60 | 32 | 8 | 85 | 25 |

EXAMPLE 5

To a mixture of 45 mol % of ferric oxide and 55 mol % of chromium oxide was added 20 % by weight of a 6 % aqueous solution of polyvinyl alcohol as a binder and the admixture was shaped into granules of 1.5 – 3.0 mm in diameter and heated at about 900°C for about 2 hours to effect sintering.

Then, 6 cc of the resulting sintered substance were packed into a quartz glass reaction tube (16 mm in inside diameter × 500 mm in length) and a gas mixture composed of 4.5 % carbon monoxide, 0.5 % hydrocarbon (propane), 7.5 % oxygen, 10.5 % carbon dioxide and 77 % nitrogen was passed through the reaction tube at a space velocity of $4 \times 10^4$/hr., whereby the rate of purification was measured at the contact temperature of 400°C. The results showed that the rates of conversion for carbon monoxide and hydrocarbons were 90 % and 92 % respectively.

EXAMPLE 6

A mixture of 45 mol % of ferric oxide, 27.5 mol % of chromium oxide and 27.5 mol % of cupric oxide was sinterd in the same manner as in Example 3 and the rates of conversion for carbon monoxide and hydrocarbons were measured using the resulting sintered substance in the same manner as described in Example 2 whereby the rates of conversion were determined as 90 % for the former and 39 % for the latter.

EXAMPLE 7

To a mixture of ferric oxide and chromium oxide was added 20 % by weight of a 6 % solution of polyvinyl alcohol as a binder and the resulting admixture was shaped into granules of 1.5 – 3.0 mm in diameter and then treated at about 900°C for about 2 hours to effect sintering.

Figure 5:
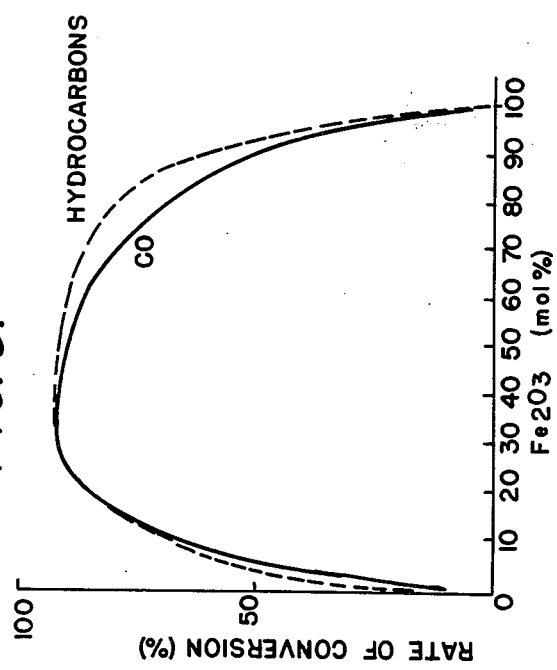
FIG. 5 is a graph showing the relation between Fe O mol% and the rate of conversion of an example of the catalyst of this invention.

Then, 6 cc of the sintered substance thus obtained were packed into a quartz glass reaction tube (1.6 mm in inside diameter × 500 mm in length) and a gas mixture composed of 4.5 5 carbon monoxide, 0.5 % hydrocarbons (propane), 7.5 % oxygen, 10.5 % carbon dioxide and 77 % nitrogen was passed through the reaction tube at a space velocity of $4 \times 10^4$/hr. FIG. 5 shows the rates of conversion for carbon monoxide and hydrocarbon at a contact temperature of 400°C with varying proportions of ferric oxide to chromium oxide. It is seen from the figure that when the ferric oxide is within the range of 5 – 90 mol %, more than 50 % of both carbon monoxide and hydrocarbons is removed.

EXAMPLE 8

To a mixture of 35 mol % of ferric oxide and 65 mol % of chromium oxide was added 20 % by weight of a 6 % solution of polyvinyl alcohol as a binder, and the resulting admixture was shaped into granules of 1.5 – 3.0 mm in diameter and heated at about 900°C for about 2 hours to effect sintering.

Figure 6:
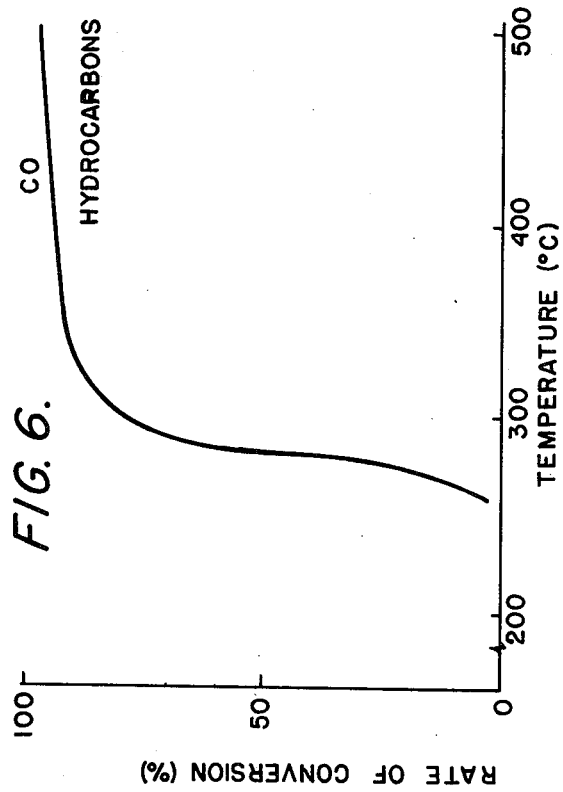

Then, 6 cc of the sintered substance thus prepared were packed into a quartz glass reaction tube (16 mm in inside diameter × 500 mm in length) and a gas mixture composed of 4.5 % carbon monoxide, 0.5 % hydrocarbon (propane), 7.5 % oxygen, 10.5 % carbon dioxide and 77 % nitrogen was passed through the reaction tube at a space velocity of $4 \times 10^4$/hr. The rates of conversion at various contact temperatures are shown in FIG. 6.

As is evident from this figure, the catalyst of this invention shows an extremely high rate of purification at the contact temperature of 300°C or higher.

EXAMPLE 9

To a mixture composed of 40 mol % of ferric oxide, 32 mol % of manganese dioxide, 8 mol % of cupric oxide and 20 mol % of aluminum oxide was added 20 % by weight, based on the total metallic oxides, of a 6 % aqueous solution of polyvinyl alcohol as a binder. The resultant admixture was first shaped into pills, then molded into columns of 3.2 mm in diameter × 3.2 mm in length by application of a load of 1000 kg/cm² and heated at about 900°C for 2 hours to effect sintering.

Figure 7:
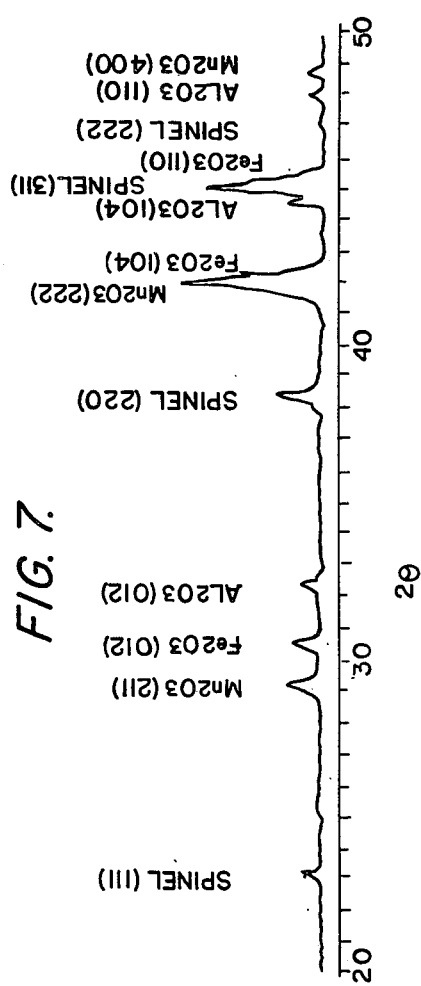
FIG. 7 is an x-ray diffraction spectrograph of an example of the catalyst of this invention reinforced with aluminum oxide.

The sintered substance thus obtained was subjected to an X-ray diffraction analysis whereby an X-ray diffraction spectrum as shown in FIG. 7 was obtained. This figure shows that this sintered substance has a spinel phase in addition to ferric oxide, manganese dioxide and aluminum oxide.

Then, 40 cc of the sintered substance thus prepared were packed into a quartz glass reaction tube (34 mm in diameter × 800 mm in length) and a gas mixture consisting of 1.0 % carbon monoxide, 0.1 % propane, 0.1 % nitrogen monoxide, 0.64 % oxygen, 98.16 % nitrogen was further mixed with 10 % by volume of steam and passed through the reaction tube at a space velocity $2 \times 10^4$/hr. whereby the rates of conversion for carbon monoxide and hydrocarbons at a variety of test temperatures were determined from the contents of individual components in the vented gas. The results are shown in Table 2 in which the component expressed as $NO_x$ includes ammonia besides nitrogen oxides. Using the same catalyst, a gas mixture consisting of 1.0 % carbon monoxide, 0.1 % propane, 3.0 % oxygen, 10.5 % carbon dioxide and 85.4 % nitrogen was further mixed with 10 % by volume of steam and passed through the reaction tube at a space velocity of $2 \times 10^4$/hr. whereby the rate of conversion for hydrocarbon (HC) at a variety of test temperatures was determined, the results being shown also in Table 2.

For the purposes of comparison, the results of tests made by using a sintered substance composed of 40 mol % of ferric oxide, 48 mol % manganese dioxide and 12 mol % cupric oxide in a manner similar to that described above are also shown in Table 2.

Table 2

| Exp. | Composition of Catalyst | | | | Temperature (°C) | Rate of Conversion (%) | | | |
|---|---|---|---|---|---|---|---|---|---|
| | $Fe_2O_3$ | $MnO_2$ | $CuO$ | $Al_2O_3$ | | CO | NO | $NO_x$* | HC |
| Example | 40 | 32 | 8 | 20 | 400 | 83 | 80 | 52 | 26 |
| | 40 | 32 | 8 | 20 | 350 | 74 | 67 | 43 | 2 |
| Comparative Example | 40 | 48 | 12 | 0 | 400 | 81 | 79 | 50 | 25 |
| | 40 | 48 | 12 | 0 | 350 | 73 | 65 | 40 | 2 |

*Nitrogen oxides + ammonia

As is evident from these results, the catalytic activity is not adversely affected by the addition of aluminum oxide.

EXAMPLE 10

To a mixture composed of 40 mol % by ferric oxide, 32 mol % manganese dioxide, 8 mol % cupric oxide and 20 mol % aluminum oxide was added 20 % by weight, based on the total weight of the metallic oxides, of a 6 % aqueous solution of polyvinyl alcohol as a binder, and the resulting admixture was first shaped into pills, then molded into columns of 3.2 mm in diameter × 3.2 mm in length by application of a load of 1000 kg/cm² and heated at about 900°C for 2 hours to effect sintering.

Figure 8:
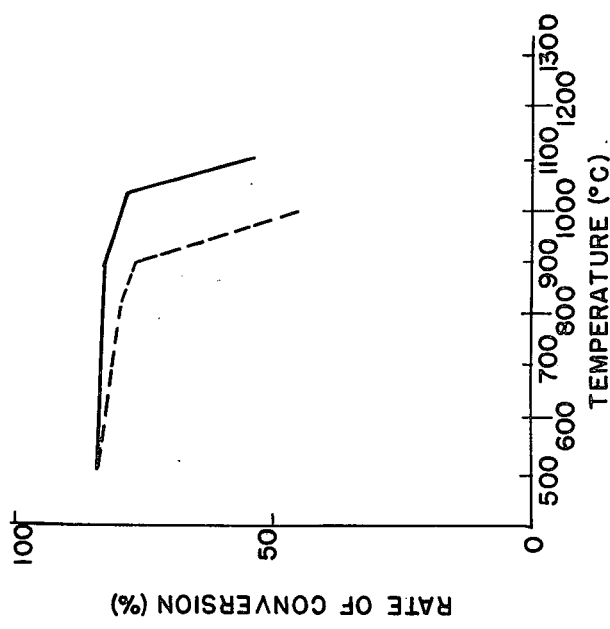
FIG. 8 is a graph showing the relation between the contact temperature and the rate of conversion of an example of the catalyst of this invention reinforced with aluminum oxide.
Figure 9:
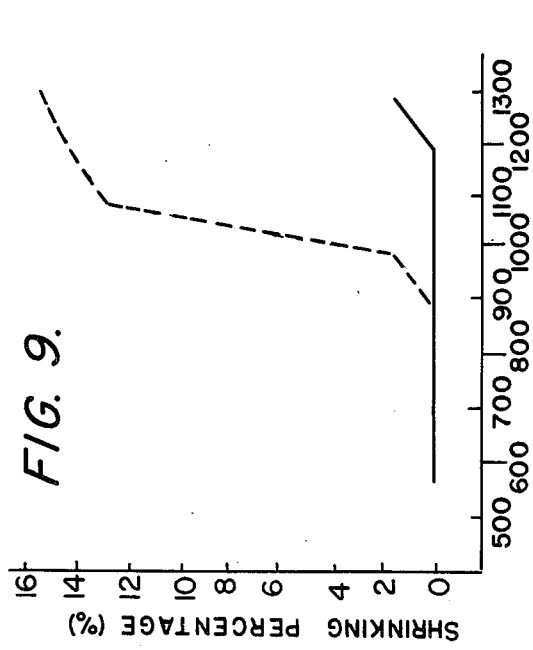
FIG. 9 is a graph showing the relation between the temperature for heat-resisting test and the shrinking percentage of the catalyst of this invention reinforced with aluminum oxide.

Then, 40 cc of the sintered substance thus produced was packed into a quartz glass reaction tube (34 mm in diameter by 80 mm in length) and a gas mixture of 1.0 % carbon monoxide, 0.1 % propane, 0.1 % nitrogen monoxide, 0.64 % oxygen, and 98.16 % nitrogen was mixed with 10 % by volume of steam and passed through the reaction tube at a space velocity of 2 × 10⁴/hr., while maintaining the sintered substance at a variety of definite temperatures. The rate of conversion for carbon monoxide was determined at every test temperature, which is shown by way of a graph in FIG. 8. The shrinking percentage for the catalyst used was also measured and the change thereof is shown in FIG. 9. A curve shown by a dotted line is given in each of FIGS. 8 and 9 for the purpose of comparison and stands for the test results obtained by using a sintered substance consisting of 40 mol % ferric oxide, 48 mol % manganese dioxide and 12 mol % cupric oxide.

From these graphs it can be seen that the catalyst of the invention maintains its activity at high temperatures and is small in the shrinking percentage (i.e. good heat resistance).

EXAMPLE 11

Ferric oxide, manganese dioxide, cupric oxide and aluminum oxide were blended in various proportions. To the blend was added 20 % by weight, based on the total weight of the metallic oxides, of a 6 % aqueous solution of polyvinyl alcohol as a binder and the resultant mixture was shaped and sintered in the same manner as described in Example 9 to prepare a catalyst.

Then, 40 cc of the catalyst thus prepared were packed into a quartz glass reaction tube (34 mm in inside diameter × 800 mm in length) and a gas mixture composed of 1.0 % carbon monoxide, 0.1 % propane, 0.1 % nitrogen monoxide, 0.64 % oxygen and 98.16 % nitrogen was mixed with 10 % by volume of steam and passed through the reaction tube to measure the rate of conversion for carbon monoxide and nitrogen monoxide at 400°C. The results are shown in Table 3.

Table 3

| Exp. No. | Catalyst Composition (mol %) | | | | Rate of Conversion (%) | |
|---|---|---|---|---|---|---|
| | Fe₂O₃ | MnO₂ | CuO | Al₂O₃ | CO | NO |
| 1 | 5 | 60 | 15 | 20 | 66 | 49 |
| 2 | 10 | 56 | 14 | 20 | 70 | 56 |
| 3 | 20 | 48 | 12 | 20 | 77 | 71 |

Table 3-continued

| Exp. No. | Catalyst Composition (mol %) | | | | Rate of Conversion (%) | |
|---|---|---|---|---|---|---|
| | Fe₂O₃ | MnO₂ | CuO | Al₂O₃ | CO | NO |
| 4 | 30 | 40 | 10 | 20 | 83 | 80 |
| 5 | 40 | 32 | 8 | 20 | 83 | 80 |
| 6 | 50 | 24 | 6 | 20 | 73 | 68 |
| 7 | 60 | 16 | 4 | 20 | 72 | 62 |
| 8 | 70 | 8 | 2 | 20 | 71 | 57 |
| 9 | 80 | 8 | 2 | 10 | 68 | 53 |
| 10 | 40 | 40 | 15 | 5 | 80 | 80 |
| 11 | 40 | 24 | 6 | 30 | 80 | 78 |
| 12 | 15 | 36 | 9 | 40 | 70 | 68 |
| 13 | 10 | 24 | 6 | 60 | 67 | 60 |
| 14 | 100 | — | — | — | 42 | 22 |

EXAMPLE 12

A sintered material obtained in a manner similar to that described in Example 11 and sintered substances obtained by adding further metallic oxide components to the basic sintered material were packed as a catalyst into a reaction tube and a gas mixture composed of 1.0 % carbon monoxide, 0.1 % propane, 3.0 % oxygen, 10.5 % carbon dioxide and 85.4 % nitrogen was mixed with 10 % by volume of steam and passed through the reaction tube at a space velocity of 2 × 10⁴/hr., while maintaining the catalyst at 400°C, to determine the rate of conversion for carbon monoxide and unburnt hydrocarbons (HC), the results being shown in Table 4.

Table 4

| Exp. No. | Composition of Catalyst (mol %) | | | | | Rate of Conversion (%) | |
|---|---|---|---|---|---|---|---|
| | Fe₂O₃ | MnO₂ | CuO | Al₂O₃ | Additive | CO | HC |
| 1 | 40 | 38 | 3 | 10 | ZnO (9 mol %) | 80 | 25 |
| 2 | 40 | 28 | 10 | 10 | Co₃O₄ (12 mol %) | 77 | 27 |
| 3 | 40 | 32 | 8 | 20 | * + SiO₂ 2 wt % | 77 | 18 |
| 4 | 40 | 32 | 8 | 20 | * + CaO 10 wt % | 77 | 23 |
| 5 | 40 | 27 | 3 | 30 | * + Cr₂O₃ 3 wt % | 80 | 25 |
| 6 | 40 | — | 50 | 10 | — | 100 | 30 |
| 7 | 40 | 10 | — | 10 | Cr₂O₃ (40 mol %) | 100 | 54 |
| 8 | 50 | 32 | 8 | 10 | * + 1.0 wt % as Ce | 99 | 13 |
| 9 | 50 | 32 | 8 | 10 | * + 1.0 wt % as W | 98 | 12 |
| 10 | 50 | 32 | 8 | 10 | * − 1.0 wt % as Ca | 95 | 22 |
| 11 | 50 | 32 | 8 | 10 | * + 1.0 wt % as K | 100 | 20 |

* Further component added to the total amount of given metallic oxides

EXAMPLE 13

To a mixture of 40 mol % of ferric oxide, 32 mol % of manganese dioxide, 8 mol % of cupric oxide and 20 mol % of aluminum oxide was added 20 % by weight, based on the total amount of the metallic oxide, of a 6 % aqueous solution of polyvinyl alcohol as a binder and the resultant mixture was first shaped into pills and then molded into columns of 3.2 mm in diameter × 3.2 mm in length by application of a load of 1000 kg/cm² and heated at about 900°C to effect sintering.

Figure 10:
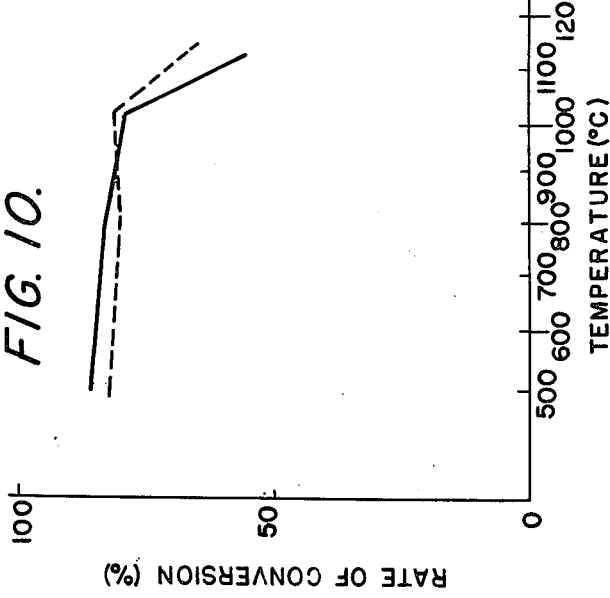
FIG. 10 is a graph showing the relation between the sintering temperature for preparing the catalyst of this invention and the rate of conversion.

Using the catalyst thus prepared, the rates of conversion for carbon monoxide and nitrogen monoxide were measured in the same manner as described in Example 9, the results being shown in FIG. 10. From FIG. 10, it is understood that since the rates of conversion decrease at a sintering temperature above 1050°C, the sintering treatment is desirably to be conducted at a temperature lower than 1050°C.

Figure 11:
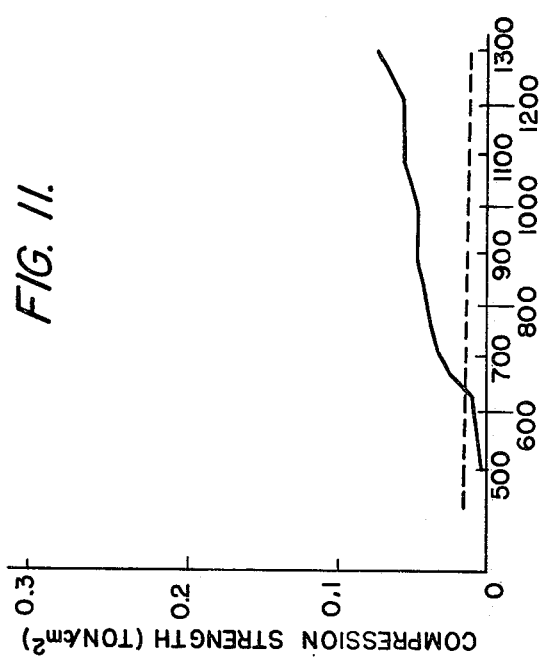
FIG. 11 is a graph showing the relation between the sintering temperature for preparing the catalyst of this invention and the compression strength.

Next, the compression strength of the same catalyst was measured by using an all purpose strength testing machine and the results are shown in FIG. 11. As is evident from this figure, adoption of a sintering temperature of 600°C or lower reduces the mechanical strength of the catalyst and so it is necessary to maintain the sintering temperature above 600°C.

EXAMPLE 14

To a mixture of 40 mol % of ferric oxide, 32 mol % of manganese dioxide, 8 mol % of cupric oxide and 20 mol % of aluminum oxide mass added 20 % by weight, based on the total amount of metallic oxides, of a 6 % aqueous solution of polyvinyl alcohol as a binder and the resultant mixture was shaped first into pills and then into pellets in the form of a cylindrical column of 3.2 mm in diameter × 3.2 mm in length by application of a load of 1000 kg/cm² and heated at about 900°C for 2 hours to effect sintering.

Then, the resultant sintered substance was impregnated with an aqueous solution of monochloromonohydroxytriamonoruthenium chloride dihydrate, dried and heated for 1 hour at about 500°C to fix about 0.003 % by weight, based on the sintered substance, of ruthenium thereto.

Figure 12:
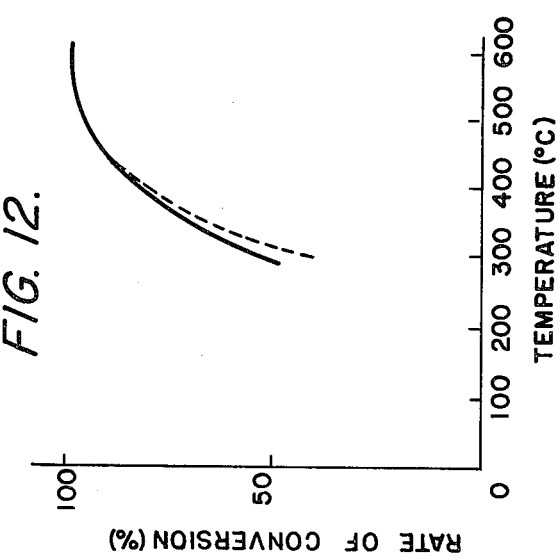
Figure 13:
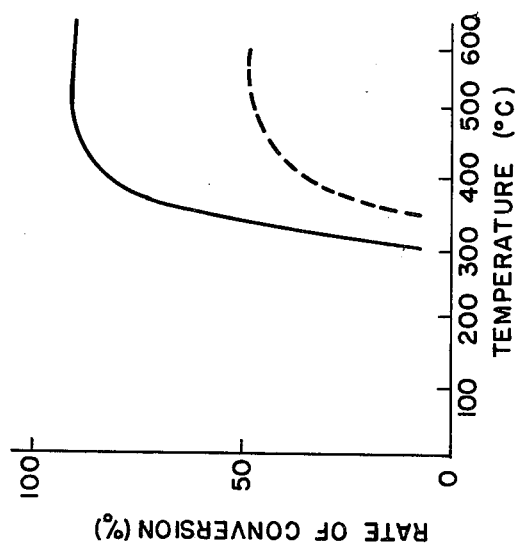

Then, 40 cc of the catalyst thus obtained were packed into a quartz glass reaction tube (34 mm in inside diameter × 800 mm in length) and a gas mixture composed of 1.0 % carbon monoxide, 0.1 % propane, 0.1 % nitrogen monoxide, 0.64 % oxygen and 98.16 % nitrogen was mixed with 10 % by volume of steam and passed through the reaction tube kept at 300° – 600°C at a space velocity of 2 × 10⁴/hr. whereby the rate of conversion was determined at every contact temperature. The rates of conversion for carbon monoxide and nitrogen compounds (nitrogen oxides and ammonia) obtained in this manner are shown in FIG. 12 and FIG. 13, respectively.

Figure 14:
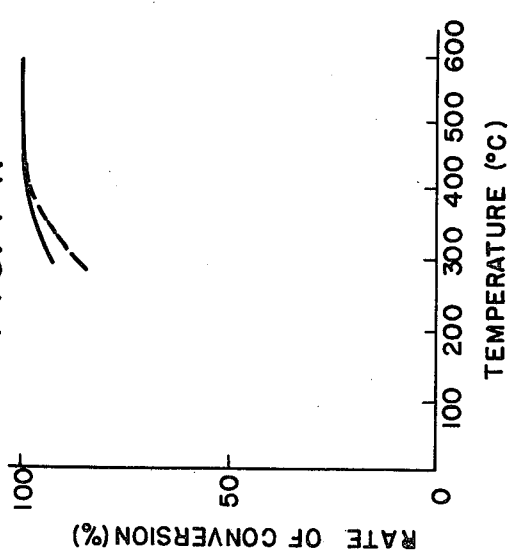

Next, a gas mixture composed of 1.0 % carbon monoxide, 0.1 % propane, 3.0 % oxygen, 10.5 % carbon dioxide and 85.4 % nitrogen was mixed with 10 % by volume of steam was passed through the same catalyst at a speed velocity of 2 × 10⁴/hr. whereby the rates of conversion for carbon monoxide and hydrocarbon were determined at every contact temperature. These results are shown in FIG. 14 and FIG. 15, respectively.

In each graph the solid line stands for the result obtained with the catalyst of this invention while the dotted line stands for the result for the purpose of comparison obtained with a ruthenium-free sintered substance (40 mol % of ferric oxide, 32 mol % of manganese dioxide, 8 mol % of cupric oxide and 20 mol % of aluminum oxide).

These graphs obviously show that in comparison with the ruthenium-free catalyst, the catalyst of this invention is higher, in the rate of conversion at a treating temperature of 400°C, by 1 % for carbon monoxide, by 4 % for hydrocarbons, and by 46 % for nitrogen oxides and ammonia.

EXAMPLE 5

In a manner similar to that described in Example 11, 0.006 – 2.0 % by weight of ruthenium was carried on pellets of a sintered substance prepared in the quite same manner as in Example 14 to prepare catalysts containing different amounts of ruthenium.

Then, the catalysts were used to determine the rates of conversion for carbon monoxide (CO), nitrogen monoxide (NO), nitrogen compounds NO$_x$ (nitrogen oxides and ammonia) and hydrocarbons (HC), using the same gas mixture and treating conditions as described in Example 14. The results are shown in Table 5.

Table 5

| Exp. No. | Amount of Ruthenium Added (wt %) | Temperature on Measurement (°C) | Rate of Conversion (%) | | | |
|---|---|---|---|---|---|---|
| | | | CO | NO | NO$_x$* | HC |
| 1 | 0 | 350 | 74 | 67 | 43 | 2 |
| | | 400 | 83 | 80 | 52 | 26 |
| 2 | 0.0006 | 350 | 75 | 71 | 45 | — |
| | | 400 | 83 | 83 | 55 | — |
| 3 | 0.003 | 350 | 76 | 72 | 62 | 9 |
| | | 400 | 84 | 91 | 83 | 30 |
| 4 | 0.015 | 350 | 86 | 98 | 90 | — |
| | | 400 | 90 | 99 | 90 | — |
| 5 | 1.00 | 350 | 93 | 100 | 91 | — |
| | | 400 | 96 | 100 | 93 | — |
| 6 | 2.00 | 350 | 97 | 100 | 93 | — |
| | | 400 | 100 | 100 | 94 | — |

*nitrogen oxides and ammonia

EXAMPLE 16

To a mixture composed of 40 mol % of ferric oxide, 48 mol % of manganese dioxide and 12 mol % of cupric oxide was added 20 % by weight, based on the total amount of the metallic oxides, of a 6 % aqueous solution of polyvinyl alcohol as a binder and the admixture was treated in the same manner as described in Example 14 to prepare a catalyst in the form of pellets carrying 0.003 % by weight of ruthenium thereon. The rates of conversion for the individual harmful gases were determined by using the resultant catalyst according to the same testing conditions as described in Example 14, the results being shown in Table 6. For the purpose of comparison, the data obtained by using a ruthenium-free catalyst are also given in Table 6.

Table 6

| Exp. No. | Amount of Ruthenium Added (wt %) | Temperature on Measurement (°C) | Rate of Conversion (%) | | | |
|---|---|---|---|---|---|---|
| | | | CO | NO | NO$_x$* | HC |
| 1 | 0 | 350 | 73 | 65 | 40 | 2 |
| | | 400 | 81 | 79 | 50 | 25 |
| 2 | 0.003 | 350 | 78 | 73 | 61 | — |
| | | 400 | 85 | 92 | 86 | — |

*Nitrogen oxides and ammonia

EXAMPLE 17

Ferric oxide was mixed with manganese dioxide, cupric oxide and aluminum oxide in various proportions. To the mixture was added 20 % by weight of an aqueous solution of polyvinyl alcohol as a binder and the resultant admixture was shaped first into pills, then molded into pellets in the form of a cylindrical column of 3.2 mm in diameter × 3.2 mm in length by application of a load of 1000 kg/cm² and heated at about 900°C for 2 hours to effect sintering. In a manner similar to that described in Example 14, 0.003 % by weight of ruthenium was carried on the sintered substance to prepare a catalyst.

The catalyst thus prepared was packed into a quartz glass reaction tube and the gas mixture was passed therethrough as described in Example 11, while keeping the reaction tube at 400°C, to determine the rates of conversion for carbon monoxide and nitrogen monoxide, the results being shown in Table 7.

Table 7

| Exp. No. | Catalyst Composition (mol %) | | | | Rate of Conversion (%) | |
|---|---|---|---|---|---|---|
| | Fe$_2$O$_3$ | MnO$_2$ | CuO | Al$_2$O$_3$ | CO | NO |
| 1 | 10 | 56 | 14 | 20 | 76 | 83 |
| 2 | 20 | 48 | 12 | 20 | 82 | 89 |
| 3 | 40 | 32 | 8 | 20 | 84 | 91 |
| 4 | 60 | 16 | 4 | 20 | 76 | 85 |
| 5 | 70 | 8 | 2 | 20 | 77 | 83 |
| 6 | 40 | 48 | 12 | 0 | 85 | 92 |
| 7 | 40 | 40 | 10 | 10 | 83 | 91 |
| 8 | 40 | 16 | 4 | 40 | 83 | 91 |
| 9 | 10 | 24 | 6 | 60 | 73 | 84 |

EXAMPLE 18

In the same manner as described in Example 14, various metallic oxides were added to ferric oxide to prepare sintered substances and 0.003 % by weight of ruthenium was then carried thereon to prepare catalysts.

Using the resultant catalysts in a manner similar to that described in Example 14, the rates of conversion at 400°C for carbon monoxide and nitrogen monoxide were determined, the results being shown in Table 8.

Table 8

| Exp. No. | Composition of Catalyst (mol %) | | | | | | Additive (wt %) | | Rate of Conversion (%) | |
|---|---|---|---|---|---|---|---|---|---|---|
| | Fe$_2$O$_3$ | MnO$_2$ | CuO | Al$_2$O$_3$ | Others | | | | CO | NO |
| 1 | 40 | 48 | 3 | — | ZnO | (9) | | | 75 | 77 |
| 2 | 40 | 36 | 12 | — | Co$_3$O$_4$ | (12) | | | 70 | 75 |
| 3 | 45 | — | — | — | NiO | (55) | | | 69 | 85 |
| 4 | 45 | — | — | — | Cr$_2$O$_3$ | (55) | | | 85 | 70 |
| 5 | 40 | 32 | 8 | 20 | | | SiO$_2$ | (2) | 67 | 90 |
| 6 | 40 | 32 | 8 | 20 | | | CaO | (10) | 68 | 75 |
| 7 | 40 | 24 | 6 | 30 | | | Cr$_2$O$_3$ | (3) | 70 | 71 |
| 8 | 40 | 48 | 12 | — | | | MgO | (20) | 62 | 83 |
| 9 | 45 | 55 | — | — | | | | | 60 | 70 |
| 10 | 45 | — | 55 | — | | | | | 83 | 80 |
| 11 | 55 | 36 | 9 | — | | | as Ce | (1) | 84 | 82 |
| 12 | 55 | 36 | 9 | — | | | as Sb | (1) | 80 | 70 |
| 13 | 55 | 36 | 9 | — | | | as Co | (1) | 82 | 84 |
| 14 | 55 | 36 | 9 | — | | | as Ti | (1) | 65 | 62 |
| 15 | 55 | 36 | 9 | — | | | as K | (1) | 84 | 82 |
| 16 | 55 | 36 | 9 | — | | | as Ag | (1) | 65 | 65 |
| 17 | 55 | 36 | 9 | — | | | as Ca | (1) | 75 | 78 |

EXAMPLE 19

To a mixture composed of 45 mol % of ferric oxide, 44 mol % of manganese dioxide and 11 mol % of cupric oxide was added polyvinyl alcohol as a binder and the resultant admixture was shaped into pills, then molded into cylindrical columns of 3.2 mm in diameter × 3.2 mm in length and baked at about 900°C for 2 hours.

Then, H$_2$PtCl$_6$·6H$_2$O was dissolved in water and the cylindrical columns were impregnated with the solution in vacuo and then heated at 600°C for 2 hours in nitrogen atmosphere.

Then, 6 cc of this catalyst was packed into a quartz glass reaction tube (16 mm in inside diameter × 500 mm in length) and a gas mixture composed of 4.5 % carbon monoxide, 5000 ppm hydrocarbon (propane), 7.5 % oxygen, 10.5 % carbon dioxide and 77 % nitrogen was passed therethrough at a space velocity of 4 × 10$^4$/hr. The relation between the proportion of platinum and the rate of conversion when taking temperature as a parameter is shown in FIG. 16 wherein the curves A and A' show the rate of conversion for carbon monoxide measured at 300°C and 250°C, respectively, and the curves B and B' show the rate of conversion for hydrocarbon measured at 300°C and 250°C, respectively. As is evident from the figure, the catalyst of this invention is particularly effective for conversion of carbon monoxide and hydrocarbon.

EXAMPLE 20

Into a cylinder provided at its top and bottom with a wire screen plate were packed 1300 cc of the catalyst obtained in Example 14. The catalyst was tested actually by using an engine with a capacity of 1600 cc of exhaust gas. The temperature of the catalyst in this test was found within the range of 455° – 534°C. FIG. 17 shows the relation between the engine condition (air/fuel ratio) and the rate of conversion for carbon monoxide thus determined.

It is understood from this figure that the catalyst of this invention exhibits an extremely high rate of conversion when the air/fuel ratio is 14 or less.

What is claimed is:

1. A catalyst mass of sintered granules consisting essentially of ferric oxide and at least one other oxide of the group consisting of copper, manganese, and chromium oxide and having at least in part a spinel crystalline structure, and prepared by sintering granules of a homogeneous solid mixture consisting essentially of about 20–75 mol % ferric oxide and about 80–25 mol % of such other oxide at a temperature within the range of about 600°–1050°C for a time of about 0.5–10 hours and sufficient to produce said spinel structure, wherein 0.0005–2.0% of metallic ruthenium or 0.1–2.0% of platinum is added, based on the weight of the sintered mixture.

2. The catalytic mass of claim 1 wherein said mixture includes 5–60 mol % of aluminum oxide as a reinforcing agent.

* * * * *

UNITED STATES PATENT AND TRADEMARK OFFICE
CERTIFICATE OF CORRECTION

PATENT NO. : 3,957,691
DATED : May 18, 1976
INVENTOR(S) : Shichiro Adachi et al

It is certified that error appears in the above—identified patent and that said Letters Patent are hereby corrected as shown below:

In the Specification:

Column 8, line 29, change "hydrocarbons" to

-- nitrogen oxides --.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*